United States Patent Office 3,308,107
Patented Mar. 7, 1967

3,308,107
PERFLUORO(2-METHYLENE-4-METHYL-1,3-DIOXOLANE) AND POLYMERS THEREOF
Stanley Selman, Wilmington, Del., and Edward Noonan Squire, Glen Mills, Pa., assignors to E. I. du Pont de Nemours and Company, Wilmington, Del., a corporation of Delaware
No Drawing. Filed Apr. 30, 1965, Ser. No. 452,367
10 Claims. (Cl. 260—87.5)

This invention relates to a new and useful compound and its homopolymer and copolymers with other monomers and to a process for the preparation of each.

The new compound of this invention is perfluoro-(2-methylene-4-methyl-1,3-dioxolane) and has the structural formula

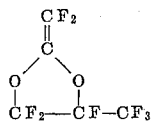

The compound is a clear, colorless liquid boiling at 44.8° C. at atmospheric pressure.

It is prepared by contacting gaseous perfluoro(2,4-dimethyl-2-fluoroformyl-1,3-dioxolane) of the formula

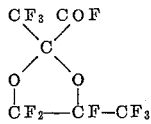

in an inert atmosphere and at a temperature of about 150° C. to about 400° C. with an anhydrous alkali or alkaline earth metal oxygen-containing salt or an oxide of a metal from Groups II-A, II-B, III-A, or IV-A of the Periodic Table for sufficient time to obtain the new compound of the present invention. Generally, a contact time of 1 to 100 sec. is sufficient. The contacting step can be carried out by passing the starting material through the salt or oxide contained in an inert organic solvent such as the diethyl ether of diethylene glycol, or the salt or oxide can be in the form of granules to form a solid or permeable base over or through, respectively, which the starting material is passed. Subatmospheric or superatmospheric pressures may be employed, but for convenience, atmospheric is preferred. The starting material is preferably accompanied by an inert gaseous diluent such as nitrogen.

Examples of the alkali and alkaline earth metal salts are the carbonates, sulfates, sulfites, phosphates, nitrates, nitrites, and silicates, with the preferred salts being sodium carbonate and sodium silicate, the latter supplied as the pure compound or derived from glass beads. Examples of metal oxides are zinc oxide, cadmium oxide, and silicon dioxide. The amount of these salts or oxides employed should be at least a stoichiometric amount, but far in excess of this amount will be present at any given time when the salt or oxide is used as a contact bed.

The conversion of the starting material to the new compound of this invention is believed to involve, first, conversion of the starting material to a salt and then decarboxylation of this salt by heating. An alternate route to the new compound is to prepare the salt of the starting material first and to then use the salt as a starting material in a pyrolysis reaction.

The new compound, perfluoro(2-methylene-4-methyl-1,3-dioxolane), of this invention is readily homopolymerized in conventional fashion; namely, in solution, emulsion, or in bulk, at temperatures ranging from −40° C. to +200° C., but preferably at room temperature, in a sealed container with an inert atmosphere and in the presence of a free radical initiator. The polymerization time, temperature, the particular initiator and its amount, the presence or absence of chain-transfer agents can all be varied in conventional manner to obtain the desired degree of monomer conversion and molecular weight. Pressure is not critical since polymerization is obtained when the monomer is in either the gaseous or liquid state.

Suitable initiators are those which are used for the free radical polymerization of unsaturated compounds. A perfluorinated initiator, such as nitrogen difluoride, $N_2F_2$, or perfluoropropionyl peroxide, is preferred in order to avoid terminal groups containing hydrocarbon residues. Potassium or ammonium persulfate are useful in an emulsion polymerization system. Other initiators include peroxides, hydroperoxides, peracids, peresters, and azo compounds. In the case of the peroxides and hydroperoxides, the preferred initiators have at least one tertiary carbon atom attached directly to the peroxide grouping, i.e., compounds such as di-α-cumyl peroxide, α-cumyl hydroperoxide, di-t-butyl peroxide and t-butyl hydroperoxide. Other suitable initiators are benzoyl peroxide, lauroyl peroxide, bis p-chlorobenzoyl peroxide, bis 2,4-dichlorobenzoyl peroxide, di-1-naphthoyl peroxide, t-butyl perbenzoate, cyclohexyl hydroperoxide, diisopropyl peroxy dicarbonate, acetyl peroxide, 2-azo bis isobutyronitrile, and benzene diazotriphenylmethyl. Polymerization can also be initiated by molecular oxygen, ultraviolet radiation, or radiation.

The homopolymer of perfluoro(2-methylene-4-methyl-1,3-dioxolane) obtained by conventional polymerization is characterized by the repeat unit

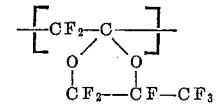

and is normally solid and of high molecular weight as measured by a high inherent viscosity and the ability to be formed into films, which when plasticized exhibit considerable toughness. The homopolymer can also be formed into fibers.

Perfluoro(2-methylene-4-methyl-1,3-dioxolane) thus has utility as a monomer for the production of homopolymers. The new compound is also useful as a chemical intermediate for the production of other fluorocarbon compounds principally by addition reactions to the double bond.

The homopolymer of perfluoro(2-methylene-4-methyl-1,3-dioxolane) is soluble in certain fluorinated organic solvents such as the perfluoro(alkyl furanes) and 2,3-dichloro-hexafluorobutene-2. Such solutions are useful as adhesives, paints, and for dip-coating. Films of the homopolymer have unusual gas permeability properties and can be employed for the separation of many gases.

The starting material, perfluoro(2,4-dimethyl-1,2-fluoroformyl-1,3-dioxolane), is prepared by reacting perfluoropyruvyl fluoride ($CF_3COCOF$) with hexafluoropropylene epoxide at a temperature of around 0° C. in the presence of an inert polar organic solvent and cesium fluoride catalyst to form an adduct which is heated to a temperature between about 100°–200° C. Perfluoropyruvyl fluoride is, in turn, prepared by reacting hexafluoropropylene epoxide with an aromatic carbonyl compound such as benzophenone.

A typical preparation of perfluoropyruvyl fluoride is as follows: Into a 500 ml. three neck flask containing a gas inlet tube, a mechanical stirrer and a gas outlet tube is placed 200 gm. of benzophenone. The gas outlet tube is connected to two cold traps in series. The first trap is maintained at −10° C. and the second trap at −80° C. during the reaction. The reaction flask is heated to, and maintained at 225° C., while hexafluoropropylene epoxide is passed through the vigorously stirred benzophenone at 80 ml. per minute. The reaction is carried out five hours and then stopped. The combined reaction product from both traps weighs 150 gm. This product consists of a small amount of trifluoroacetyl fluoride, about 30 gm. of unreacted hexafluoropropylene epoxide and the remainder is perfluoropyruvyl fluoride. The perfluoropyruvyl fluoride is purified by fractional distillation. The purified product has a boiling point of 9° to 10° C.

A procedure for the preparation of perfluoro(2,4-dimethyl-2-fluoroformyl-1,3-dioxolane) is as follows: Into a 200 ml. flask containing a magnetic stirrer is placed 3 gm. of cesium fluoride and 20 ml. of the dimethyl ether of diethylene glycol. The flask is cooled to 0° C. and 44 gm. of perfluoropyruvyl fluoride is added. The reaction mixture is kept at 0° C., and hexafluoropropylene epoxide, 50.6 gm., is gradually added. The reaction proceeds rapidly during the addition of the epoxide consuming the epoxide as rapidly as it is added. The reaction mixture is then transferred to a steel lined autoclave and heated for five hours at a temperature of 140° C. The lower layer of the resulting product is distilled and yields perfluoro(2,4 - dimethyl - 2 - fluoroformyl-1,3-dioxolane) boiling point 60.5° C. in 70% yield.

The following examples illustrate the preparation and homopolymerization of the new compound of this invention. Parts and percents are by weight unless otherwise indicated.

Example 1

Perfluoro(2,4 - dimethyl-2-fluoroformyl-1,3-dioxolane) was passed through a loosely packed bed of 8–14 mesh dried sodium carbonate in an 18″ x ¾″ diameter vertical Pyrex tube maintained at a temperature of 295° C. in a current of nitrogen. The perfluoro(2,4-dimethyl-2-fluoroformyl-1,3-dioxolane) was fed at a rate of 0.02 mole per hour and the nitrogen was fed at a rate of 100 ml. per minute. The contact time was thus about 35 seconds. The product gas collected in a cold trap and consisted of perfluoro(2-methylene-4-methyl-1,3 - dioxolane), boiling point 44.8° C. The conversion was 100% and the yield was 96–99.4% theoretical.

*Anal.*—Calculated for $C_5F_8O_2$: C, 24.6%; F, 62.3%. Found: C, 24.9%; F, 62.3%.

The infrared and nuclear magnetic resonance spectra of the compound are in accord with the structure:

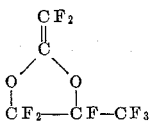

The infrared spectrum is characterized by major absorption bands at 8.0 and 8.1 (doublet), 7.5, 8.6, 8.9, 9.75μ ascribable to C—C, C—F, and C—O bonds. There is a weak absorption at 5.4μ probably due to the C=CF$_2$ group. An additional major absorption at 13.7μ can be ascribed to the perfluoromethyl group. The infrared absorption bands normally ascribed to C—H vibrations are not present in the spectra.

The NMR $F^{19}$ spectrum at 56.4 meg.c./sec. indicates the presence of —CF$_3$, —CF$_2$O, =CF$_2$, and —CF— groups by absorptions respectively at 82.8, 87.3 (4 line pattern), 128.4 and 129.9 p.p.m. high field of standard CCl$_3$F. The area ratios of 3:2:2:1 of the peaks is in accord with the above assignments.

Example 2

A glass Carius tube was evacuated, cooled to —78° C. and charged with 32.9 g. of perfluoro(2-methylene-4-methyl-1,3-dioxolane) and 0.003 g. of nitrogen fluoride (N$_2$F$_2$), as a mixture of the cis- and trans-isomers. The tube was sealed and upon warming to room temperature an exotherm was observed with a temperature rise to 32° C. The polymerization was allowed to proceed at room temperature for 16 hours. The tube was opened and there was obtained 31.0 g. of polymer. The polymer was found to be soluble in a fluorocarbon solvent sold under the trade name FC–75 and believed to be consisting predominantly of perfluorinated alkylfuranes. The inherent viscosity of 0.5% solution in FC–75 was found to be 1.22 at 29° C. The polymer could be compression molded at 275° C. and 600 p.s.i. into a clear, colorless, transparent film having a tensile strength at 23° C. of 2830 p.s.i. and an elongation of 1.7%.

*Analysis.*—Calculated for $(C_5F_8O_2)_n$: C, 24.6%; F, 62.3%. Found: C, 24.7%; F, 62.2%.

The new compound of this invention can be copolymerized with a wide variety of one or more monomers which contain ethylenic unsaturation, preferably terminal unsaturation, and which are polymerizable with a free radical initiator. Copolymerization of the new compound with monomers, such as ethylene and tetrafluoroethylene, which homopolymerize to crystalline homopolymers, can reduce the crystallinity of such polymers. The new compound also contributes increased thermoplasticity and stiffness to crystalline homopolymers. Generally, at least 0.05% by weight of the copolymer should consist of units derived from perfluoro(2-methylene-4-methyl-1,3-dioxolane) in order for the effect of this compound to be noticeable. The exact amount that is present or used, however, will depend on the particular comonomer(s) present and properties desired. The free radical initiators hereinbefore described for the homopolymerization of perfluoro(2-methylene-4-methyl-1,3-dioxolane) can generally be employed to initiate the copolymerization reaction. A perfluorinated initiator is preferred when it is desired to avoid terminal groups containing hydrocarbon residues.

Examples of copolymerizable monomers are the perhalogenated α-olefins containing from 2–10 carbon atoms, including chlorotrifluoroethylene and perfluorinated olefins, such as tetrafluoroethylene and hexafluoropropylene. Additional monomers are the perfluoro(vinyl ethers), such as perfluoro-(methyl vinyl ether) and perfluoro(propyl vinyl ether), omega-hydroperfluoro(vinyl ethers), and the perfluorodivinyl ethers, such as perfluoroethylene bis(perfluorovinyl ether) and perfluorotetramethylene bis(perfluorovinyl ether). The preferred comonomers are those which are perfluorinated in order that the resultant copolymers have high thermal stability.

Other copolymerizable monomers are the (a) aliphatic α-monoolefins having from 2–20 carbon atoms and including hydrocarbon monoolefins such as ethylene, propylene, butene-1, isobutene, hexene-1, 2-ethyl-hexene-1, decene-1, octodecene-1, and vinyl cyclohexane and partially halogenated monoolefins, such as vinyl fluoride, vinylidene fluoride, vinyl chloride, and vinylidene chloride; (b) conjugated diolefins such as chloroprene and the hydrocarbon dienes, such as butadiene, isoprene, and cyclopentadiene; (c) nonconjugated diolefins, particularly the hydrocarbon dienes, such as 5-methylene-2-norbornene, 1,4-hexadiene, dicyclopentadiene, and 5-alkenyl-2-norbornenes; (d) aromatic vinyl compounds, such as styrene, p-methoxystyrene, and vinyl naphthalene; (e) α/β unsaturated acids, such as acrylic acid and methacrylic acid; (f) lower alkyl esters of α/β unsaturated acids, such as methyl acrylate, methyl methacrylate, ethyl methacrylate, n-butyl methacrylate, diethyl fumarate, dibutyl maleate, and diethylitaconate; (g) vinyl substituted heterocyclic compounds, such as vinyl pyridine, vinyl carbazole, N-vinyl phthalimide, and vinyl furan; (h) α/β unsaturated nitriles such as acrylonitrile and methacrylonitrile; (i) α/β unsaturated aldehydes, such as acrolein and methacrolein; (j) halogen-free alkyl vinyl ethers, such as methyl vinyl ether and t-butyl vinyl ether; (k) vinyl ketones, such as methyl vinyl ketone and isopropyl vinyl ketone; (l) vinyl esters, such as vinyl acetate and vinyl propionate; and (m) alkyl trifluorovinyl ethers in which the alkyl is preferably lower alkyl, such as methyl, ethyl, or butyl. The uses of these copolymerizable monomers as homopolymers and components of copolymers are well known in the art; and as a general rule, these uses still remain when perfluoro(2-methylene-4-methyl-1,3-dioxolane) is incorporated therein. Some of the resultant copolymers are useful for the separation of gases from each other.

The new compound, perfluoro(2-methylene-4-methyl-1,3-dioxolane), of this invention is particularly useful as a copolymerization monomer with tetrafluoroethylene. The known techniques for the polymerization of tetrafluoroethylene lead to polymers having a melt viscosity of the order of $10^{11}$ poises. Such polymers are too viscous to be fabricated by conventional melt fabrication techniques used for other thermoplastics such as extrusion, injection molding, or the like. It is known that the copolymerization of tetrafluoroethylene with each perfluorinated monomers produces fluorocarbon polymers which are melt fabricable. The production of such melt fabricable fluorocarbon polymers has previously required substantial amounts of the comonomer which decreases the melting point and stiffness of the ultimate copolymer. It has now been found that the copolymers of as little as 0.5% by weight of perfluoro(2-methylene-4-methyl-1,3-dioxolane) with tetrafluoroethylene have a melt viscosity of about $10^6$ which permits practical melt fabrication. Such copolymers have a higher melting point, superior thermal stability, and greater stiffness than prior art melt-fabricable tetrafluoroethylene copolymers as well as fluorocarbon plastics in general. Copolymers of tetrafluoroethylene with as little as 0.05% by weight of perfluoro(2-methylene-4-methyl-1,3-dioxolane) although not melt fabricable, have improved sintering properties over the tetrafluoroethylene homopolymer. The copolymerization of the new compound of this invention with tetrafluoroethylene is carried out according to conventional techniques.

The following examples illustrate the copolymerization of the new compound of this invention with tetrafluoroethylene and with other unsaturated, free radical polymerization initiated monomers. Parts and percents are by weight unless otherwise indicated.

*Example 3*

(A) Into a Carius tube, evacuated and chilled to $-80°$ C. there was charged 3 ml. measured at $-80°$ C. of tetrafluoroethylene, 7 ml. measured at 26° C. of perfluoro(2-methylene-4-methyl-1,3-dioxolane) and 20 ml. as a gas of a 2.9% mixture of cis- and trans-nitrogen difluoride in nitrogen. After sealing the tube, it was brought to room temperature and allowed to stand 24 hours. There was obtained 12 gm. of a copolymer which could be pressed at 275° C. and 600 p.s.i. to yield a clear, colorless, transparent, stiff film. By elemental analysis the copolymer contained 89.6 mole percent (95.5 weight percent) perfluoro(2 - methylene - 4 - methyl-1,3-dioxolane) monomer units and 10.4 mole percent (4.5 weight percent) tetrafluoroethylene monomer units.

(B) Into a 330 ml. shaker tube at $-80°$ C. there was charged 153 ml. of trichloro-trifluoroethane, $CCl_2FCClF_2$, 0.15 gm. of $(C_2F_5COO)_2$, 24.4 gm. perfluoro(2-methylene-4-methyl-1,3-dioxolane) and between 30 and 35 gm. of tetrafluoroethylene. The tube was agitated and brought to 40–50° C. at which temperature polymerization occurred rapidly. 57 gm. of polymer were obtained which were compression molded at 225° C. and 600 p.s.i. into clear, transparent, colorless, tough films. By elemental analysis, the copolymer was found to contain 81 mole percent (63.6 weight percent) of tetrafluoroethylene monomer units and 19 mole percent (36.4 weight percent) of perfluoro(2-methylene-4-methyl-1,3-dioxolane) monomer units.

(C) Into a 330 ml. shaker tube there was charged 160 ml. of deionized water, 0.3 gm. of ammonium persulfate and 0.3 gm. of ammonium perfluorooctanoate, 2.0 gm. of perfluoro(2-methylene-4-methyl - 1,3 - dioxolane) and approximately 70 gm. of tetrafluoroethylene. The shaker tube was heated to 75° C. at autogenous pressure for 3 hours and agitated at 84, 12-inch strokes per minute. There was obtained 71.4 gm. of polymer. This was pressed at 350° C. and 600 p.s.i. into transparent, tough films. By analysis, the copolymer contained 97.6 weight percent tetrafluoroethylene monomer units and 2.4 weight percent perfluoro(2-methylene - 4 - methyl-1,3-dioxolane) monomer units.

(D) A series of tetrafluoroethylene/perfluoro(2-methylene-4-methyl-1,3-dioxolane) copolymers was made using substantially the procedure given in Example 3A. The ingredients of the Carius tube charges, the polymerization cycles and the composition of the resultant polymers are set forth in Table 1.

TABLE 1.—POLYMERIZATION CONDITIONS FOR TETRAFLUOROETHYLENE/PERFLUORO(2-METHYLENE-4-METHYL-1,3-DIOXOLANE) COPOLYMERS

| 30 ml. Carius Tube Charge | | | | | Polymerization Cycle | | | | Copolymer Analysis, Wt. Percent of |
|---|---|---|---|---|---|---|---|---|---|
| $C_2F_4$ (liq. ml.)[1] | 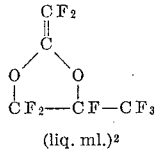 (liq. ml.)[2] | Perfluoro Dimethyl Cyclobutane (ml.)[3] | $N_2F_2$ (in.)[4] | | Time (hr.) | Temp. (°C.) | Time (hr.) | Temp. (°C.) | 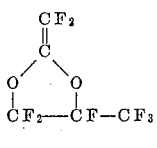 |
| 3.0 | 2.0 | 15 | 20 | | 20 | 26 | 5 | 95 | 66.6 |
| 4.0 | 2.0 | 15 | 20 | | 20 | 26 | 3 | 75 | 12.4 |
| 5.5 | 0.5 | 15 | 20 | | 20 | 26 | -------- | -------- | 3.9 |
| 5.5 | 0.1 | 15 | 20 | | 16 | 26 | -------- | -------- | 1.0 |

[1] Measured at $-80°$ C.
[2] Measured at 26° C.
[3] Mixed isomer; measured at 26° C.
[4] 2.9% by volume of the mixed cis- and trans-isomers of $N_2F_2$ in nitrogen measured in inches of mercury pressure at 26° C.

The physical characteristics of the resultant products, measured on compression molded films, molded at 600 p.s.i. for two to three minutes at the temperatures indicated in the table are shown in Table 2.

TABLE 2.—CHARACTERISTICS OF COMPRESSION FORMED TETRAFLUOROETHYLENE/PERFLUORO (2-METHYLENE-4-METHYL-1,3-DIOXOLANE) COPOLYMER FILMS

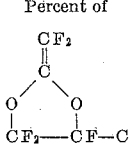

| Copolymer Wt. Percent of CF2=C(O-CF2-CF(CF3)-O) | Press.[1] Temp. (°C.) | Film Thick. (mil) | Yield Stress (p.s.i.) | Tensile[2] Str. (p.s.i.) | Ult. Str. (p.s.i.) | Ult. Elong. (percent) | Tensile Mod. (p.s.i.) | Wt. Loss[4] 300° C. (percent) | Optical[5] Character |
|---|---|---|---|---|---|---|---|---|---|
| 66.6 | 300 | 10 | 3,310 | 4,530 | 4,530 | 15.4 | nm[3] | nm | Clear, transparent. |
| 12.4 | 300 | 7 | nm | 4,350 | 4,060 | 10.2 | nm | nm | Hazy, transparent. |
| 3.9 | 350 | 9 | 3,850 | 3,850 | nm | 18.1 | nm | nm | Hazy, transparent. |
| 1.0 | 370 | 8 | 2,120 | 3,410 | nm | 220 | 50,500 | 0.0–0.2 | Hazy, transparent. |

[1] Pressure was 600 p.s.i., time was 2 or 3 minutes, films were cooled in press.
[2] Tensile characteristics were measured using ASTM D-1708 method—all characteristics of 23° C. unless otherwise noted.
[3] Not measured.
[4] Samples were heated 50 hours at 300° C. in circulating air—British Standards Institution—Document No. D63/13885 states that for PTFE film weight loss shall not exceed 0.5% in 5 hour heating cycle.
[5] By eye.

Example 4

Varying amounts of perfluoro(2-methylene-4-methyl-1,3-dioxolane) was copolymerized with 60 gm. of tetrafluoroethylene (measured by its pressure at −80° C. in the polymerization tube) in separate 330 ml. shaker tubes each containing 160 ml. of $CCl_2FCClF_2$ solvent and perfluoropropionyl peroxide initiator. Each polymerization reaction was carried out under autogenous pressure at 60° C. for 0.5 hr. The polymerization conditions and results are in Table 3.

Melt viscosity measurements were made on the following copolymers of tetrafluoroethylene and perfluoro(2-methylene-4-methyl-1,3-dioxolane):

| Tetrafluoroethylene, wt. percent | 380° C. Melt Viscosity, 5 min. (×10⁴ poise) | Compression Forming Conditions, °C./p.s.i./min. |
|---|---|---|
| 97.4 | 890 | 355–370/600/3 |
| 95.1 | 527 | 355/600/3 |
| 97.7 | 345 | 355/600/3 |

The resultant films were of excellent quality.

Example 5

Into a Carius tube there was charged 10 ml. of trichloro-trifluoroethane $CCl_2FCClF_2$ ("Freon 113"), 6 ml. measured at −80° C. hexafluoropropylene, 2 ml. of perfluoro(2-methylene-4-methyl-1,3-dioxolane) and 20 ml. of a 2.9% cis-, trans-$N_2F_2$, nitrogen mixture. The tube was sealed and allowed to stand at room temperature for 16 hours, then heated for 3 hours at 75° C. There was obtained 2.3 gm. of polymer which was pressed at 250° C. and 600 p.s.i. into a stiff, clear, transparent, colorless film. By elemental analysis, the copolymer contained 94.5 mole percent (96.5 weight percent) of perfluoro(2-methylene-4-methyl-1,3-dioxolane) and 5.5 mole percent (3.5 weight percent) of hexafluoropropylene.

Example 6

Into a Carius tube there was charged 15 ml. of perfluorodimethylcyclobutane, 2 ml. of perfluoro(2-methylene-4-methyl-1,3-dioxolane), 5 ml. (at −80° C.) of perfluoromethyl perfluorovinyl ether and 20 ml. of a 2.9% cis-, trans-nitrogen difluoride, nitrogen mixture. The tube was then sealed and allowed to stand 16 hours at 25° C. and then heated for 20 hours at 100° C. There was obtained 3.6 gm. of polymer, which was compression formed into a clear, transparent, colorless, stiff film at 200° C. and 500 p.s.i. By analysis, the copolymer was found to contain 63 weight percent perfluoro(2-methylene-4-methyl-1,3-dioxolane) monomer units and 37 weight percent perfluoromethyl perfluorovinyl ether monomer units.

Example 7

Into an evacuated 30 ml. Carius tube there was charged 10 ml. of trichloro-trifluoroethane, $CCl_2FCF_2Cl$, 2 ml. of perfluoro(2-methylene-4-methyl-1,3-dioxolane), 5 ml. of perfluoropropyl perfluorovinyl ether and 0.02 gm. of $(C_2F_5COO)_2$. The sealed tube was allowed to stand at 26° C. for 1 hour and for a further hour at 100° C. There was obtained 3.5 gm. of copolymer which was compression molded at 200° C. and 600 p.s.i. into a clear, colorless, transparent, stiff film. By elemental analysis, the copolymer contained 93.5 weight percent perfluoro(2-methylene-4-methyl-1,3-dioxolane) and 6.5 weight percent of perfluoropropyl perfluorovinyl ether.

Example 8

Into a 110 ml. shaker tube, there was charged 40 ml. of benzene, 0.02 gm. of α,α-azodiisobutyronitrile, 2 ml. of perfluoro(2-methylene-4-methyl-1,3-dioxolane). After chilling to −80° C., the tube was loaded with ethylene (1200–1300 p.s.i. at room temperature). The temperature was raised to 75° C. and held for 3 hours while the tube contents were agitated at a rate of 84, 12-inch strokes per minute. There was obtained 4.6 gm. of polymer, TABLE 3.—PERFLUORO(2-METHYLENE-4-METHYL-1,3-DIOXOLANE)/TETRAFLUOROETHYLENE COPOLYMERS

[Characteristics of 10–12 ml. thick polymer films pressed at 350–370° C. and 600 p.s.i.]

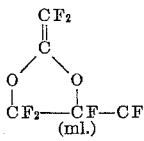

| Sample | Initiator (gm.) | CF2=C(O-CF2-CF(CF3)-O) (ml.) | Polymer Wt. (gm.) | Crystalline,[1] M.P. (°C.) | Crystallinity[2] (Percent) | PMD[3] Content, Wt. Percent | 380° C. Melt Viscosity (×10⁴ poise) | Tensile Characteristics at 250° C. | | |
|---|---|---|---|---|---|---|---|---|---|---|
| | | | | | | | | Mod.[4] | Str.[4] | Elong., Percent |
| a | 0.5 | 0.25 | 48.2 | 318 | 67 | 0.8 | 79 | 5,900 | 726 | 500 |
| b | 1.0 | 0.3 | 47.0 | 317 | 71 | 1.0 | 13.8 | 5,530 | 436 | 390 |
| c | 0.6 | 0.5 | 34.7 | 317 | 59 | 1.6 | 54.6 | 7,590 | 804 | 560 |
| d | 0.4 | 0.5 | 39.0 | 313 | 67 | 1.7 | 97.6 | 4,210 | 912 | 550 |
| e | 0.5 | 1.0 | 42.0 | 313 | 67 | 2.0 | 27 | 4,600 | 891 | 530 |
| f | 0.5 | 1.0 | 34.4 | 309 | 56 | 3.6 | 15.3 | 5,180 | 1,070 | 580 |

[1] By DTA. [2] By X-ray. [3] Units derived from perfluoro(2-methylene-4-methyl-1,3-dioxolane). [4] P.s.i.

which was compression molded at 185° C. and 200 p.s.i. into a clear, colorless, transparent, rubbery film. By elemental analysis, the copolymer was found to contain 34.6 weight percent perfluoro(2-methylene-4-methyl-1,3-dioxolane) monomer units and 65.4 weight percent ethylene monomer units.

Example 9

Into an evacuated, 30 ml. Carius tube at −80° C., there was charged 10 ml. of perfluorodimethyl cyclobutane, 2 ml. of perfluoro(2-methylene-4-methyl-1,3-dioxolane), 2 ml. at −80° C. of tetrafluoroethylene, and 5 ml., measured at −80° C. of perfluoromethyl perfluorovinyl ether; the evacuated tube was charged with approximately $10^{-4}$ moles of nitrogen difluoride in nitrogen. The sealed tube was held at 25° C. for 16 hours and then heated 20 hours at 100° C. There was obtained 4.7 gm. of polymer which was compression molded at 175° C. and 600 p.s.i. into a tough, transparent, clear, colorless film. The tensile strength at 23° C. was 3020 p.s.i. with an ultimate elongation of 180%. By analysis, the copolymer contained 65 weight percent tetrafluoroethylene monomer units, 18 weight percent perfluoro(2-methylene-4-methyl-1,3-dioxolane) monomer units and 17 weight percent perfluoromethyl perfluorovinyl ether monomer units.

Example 10

Into an evacuated 300 ml. shaker tube at −80° C. there was charged 160 ml. of trichloro-trifluoroethane, $CCl_2FCClF_2$, 1.0 gm. of $(C_2F_5COO)_2$, 4.8 gm. of perfluoro(2-methylene-4-methyl-1,3-dioxolane), 16.5 gm. of perfluoropropyl perfluorovinyl ether and approximately 50 gm. of tetrafluoroethylene. The tube was agitated at a rate of 84, 12-inch strokes per minute while being warmed to 44° C. at which temperature polymerization occurred rapidly with a sharp exotherm of less than 2 minutes.

There was obtained 55.5 gm. of polymer having a melt viscosity of $1.07 \times 10^4$ poise at 380° C. Tough, transparent, clear films were compression molded from the copolymer at 300° C. and 600 p.s.i. By infrared spectroscopy the copolymer was found to contain 8.5 weight percent perfluoro(2-methylene-4-methyl-1,3-dioxolane) monomer units, 6.3 weight percent perfluoropropyl perfluorovinyl ether monomer units and 85.2 weight percent tetrafluoroethylene monomer units.

Example 11

Into an evacuated, chilled 3 ml. Carius tube there was charged 0.05 ml. of perfluoro(2-methylene-4-methyl-1,3-dioxolane), 0.3 ml. of perfluorodivinyl ether of perfluoroethylene glycol, disclosed in U.S. Pat. No. 3,114,778, 0.0004 gm. $(C_2F_5COO)_2$ in 0.02 ml. of trichloro-trifluoroethane. The sealed tube was allowed to stand 16 hours at room temperature and there was obtained 0.12 gm. of copolymer which was case into a transparent, colorless, clear, stiff film. By analysis, the copolymer contained 85 weight percent perfluoro(2-methylene-4-methyl-1,3-dioxolane) monomer units.

Example 12

Perfluoro(2-methylene-4-methyl-1,3-dioxolane) was copolymerized with various monomers in separate 30 ml. Carius tubes each containing 10 ml. of $CCl_2FCClF_2$ solvent and 0.008 gm. of perfluoropropionyl peroxide initiator, as follows:

TABLE 4.—POLYMERIZATION DATA [1]

| Sample | $\begin{array}{c}CF_2\\\|\\C\\/\ \backslash\\O\ \ \ O\\\|\ \ \ \ \|\\CF_2—CF—CF_3\end{array}$ (ml.) | Other Monomer(s) | (Ml.) | Polymerization Conditions | |
|---|---|---|---|---|---|
| | | | | Temp. (° C.) | Time (hr.) |
| a | 1.0 | Tetrafluoroethylene<br>Perfluoroethylene-bis(divinyl ether) | 1.0<br>0.2 | 26 | 16 |
| b | 4.0 | Methyl perfluorovinyl ether | 8.0 | 26 | 16 |
| c | 4.0 | Styrene | 1.0 | 26 | 64 |
| d | 4.0 | Methyl methacrylate | 1.0 | 26 | 64 |
| e | 4.0 | Acrylonitrile | 1.0 | 26 | 64 |
| f | 4.0 | Acrolein | 1.0 | 26 | 24 |
| g | 4.0 | Vinyl acetate | 1.0 | 26 | 24 |
| h | 4.0 | Acrylic acid | 1.0 | 26 | 24 |
| i | 2.0 | Propylene | 1.5 | 26 | 24 |
| j | 2.0 | Propylene<br>Tetrafluoroethylene | 2.0<br>1.0 | 26 | 24 |

[1] The results of these polymerizations are in Table 5.

TABLE 5.—COPOLYMERS OF PERFLUORO(2-METHYLENE-4-METHYL-1,3-DIOXOLANE) WITH VARIOUS OTHER MONOMERS

| Sample | Polymer Wt. (gm.) | $\begin{array}{c}[—CF—C—]\\\ \ \ \ \ \ \ /\ \backslash\\\ \ \ \ \ O\ \ \ O\\\ \ \ \ \ \|\ \ \ \ \|\\CF_2\ —CF—CF_3\end{array}$ (Wt. Percent) | Comonomer (Wt. Percent) | Description of Polymer |
|---|---|---|---|---|
| a | 7.8 | 38.4 | [1] 61.1<br>[2] 0.5 | Clear, transparent film cast from $Cl_2FCClF_2$.<br>Crosslinks upon heating between 100 and 340° C. |
| b | 8.8 | 46.0 | 54.0 | Clear, transparent film cast from $Cl_2FCClF_2$ or pressed from polymer at 170° C. |
| c | 1.2 | 2.6 | 97.4 | Clear, transparent film pressed at 175–250° C. |
| d | 1.2 | 9.4 | 90.6 | Clear, transparent film pressed at 170–250° C. |
| e | 0.5 | 9.3 | 90.7 | Clear, transparent film pressed at 175° C. |
| f | 0.8 | 11.5 | 88.5 | Stiff, transparent film pressed at 175° C. |
| g | 4.2 | 74.5 | 25.5 | Clear, transparent film pressed at 175° C. |
| h | 4.8 | 76.6 | 23.4 | Stiff, hazy film pressed at 175° C. |
| i | 0.3 | 81.0 | 19.0 | Clear, transparent film cast from $Cl_2FCClF_2$. |
| j | 0.5 | | [3] 20.5 | Clear, transparent film cast from $Cl_2FCClF_2$. |

[1] Tetrafluoroethylene.   [2] Perfluoroethylene bis(divinyl ether).   [3] Propylene.

As many apparently widely different embodiments of this invention may be made without departing from the spirit and scope thereof, it is to be understood that this invention is not limited to the specific embodiments thereof except as defined in the appended claims.

What is claimed is:
1. Perfluoro(2-methylene-4-methyl-1,3-dioxolane).
2. A solid homopolymer of perfluoro(2-methylene-4-methyl-1,3-dioxolane) in which polymerization of said dioxolane occurs thru the double bond.
3. Solid polymers of perfluoro(2-methylene-4-methyl-1,3-dioxolane) in which polymerization of said dioxolane occurs thru the double bond.
4. A solid copolymer of perfluoro(2 - methylene - 4-methyl-1,3-dioxolane) with a free-radical polymerizable unsaturated monomer, said copolymer containing at least 0.05% by weight of perfluoro(2-methylene-4-methyl-1,3-dioxolane) in which copolymerization of said dioxolane occurs thru the double bond.
5. A solid copolymer of perfluoro(2 - methylene - 4-methyl-1,3-dioxolane) and tetrafluoroethylene, said copolymer containing at least 0.05% by weight of perfluoro-(2-methylene-4-methyl-1,3-dioxolane) in which copolymerization of said dioxolane occurs thru the double bond.
6. A melt fabricable copolymer of perfluoro-(2-methylene-4-methyl-1,3-dioxolane) and tetrafluoroethylene, said copolymer containing at least 0.5% by weight of perfluoro(2-methylene-4-methyl-1,3-dioxolane) in which copolymerization of said dioxolane occurs thru the double bond.
7. The homopolymer of claim 2 in the form of a film.
8. The copolymer of claim 4 in the form of a film.
9. The melt fabricable copolymer of claim 6 in the form of a shaped article.
10. Polymers of claim 3 in the form of a film.

No references cited.

JOSEPH L. SCHOFER, *Primary Examiner.*

M. L. BERCH, *Assistant Examiner.*